Dec. 23, 1947.  W. S. SCHAEFER  2,433,296
GAS CARRYING MANDREL FOR PIPE WELDING
Filed Nov. 27, 1944
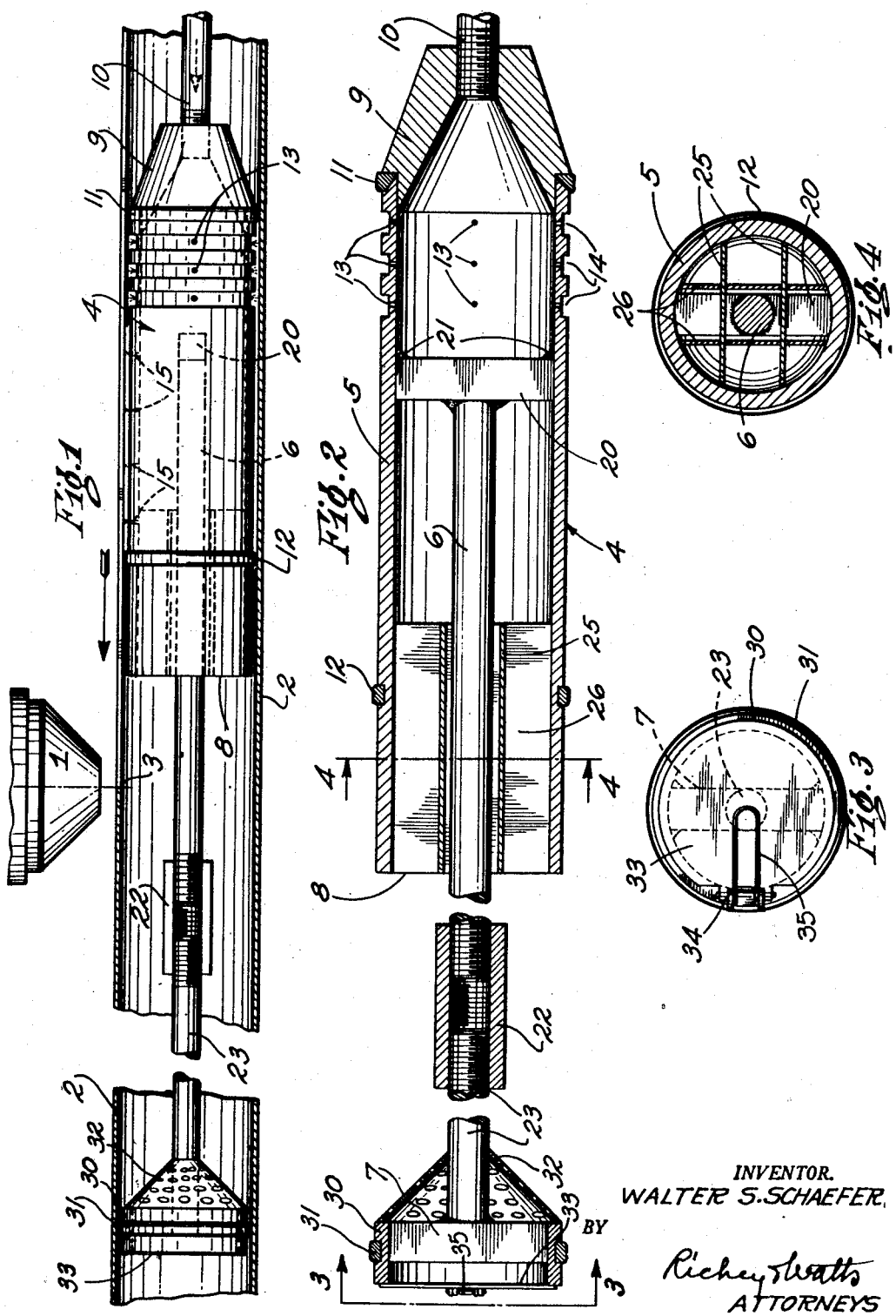
INVENTOR.
WALTER S. SCHAEFER,
BY
Richey Watts
ATTORNEYS Patented Dec. 23, 1947

2,433,296

UNITED STATES PATENT OFFICE 2,433,296

GAS CARRYING MANDREL FOR PIPE WELDING

Walter S. Schaefer, Cleveland, Ohio, assignor to Republic Steel Corporation, Cleveland, Ohio, a corporation of New Jersey Application November 27, 1944, Serial No. 565,243

10 Claims. (Cl. 113—59)

This invention relates generally to the art of welding tubing blanks having longitudinal seam edges and particularly to new apparatus for welding such seams by the use of atomic hydrogen.

Atomic hydrogen welding as generally practiced heretofore has included the steps of establishing an arc between two electrodes closely adjacent to the seam edges of the blank and delivering hydrogen gas into the space just outside of the tube about the electrodes. Welds made in this manner have had considerable flash metal on the inside of the welded blank, except in cases where means such as a shoe was pressed against the inner surface of the blank and prevented formation of such flash.

So far as I know, hydrogen gas was maintained within the blank in only one instance heretofore, viz: in the process disclosed in the copending application of Walter Kopec, Ser. No. 463,271 filed Oct. 24, 1942, now Patent No. 2,422,305, issued June 17, 1947. The advantages of maintaining hydrogen within a tube blank during, and at the place of, welding are described in that application. While the advantages traceable to the use of the Kopec method and apparatus are quite substantial, I have found that even better results can be obtained by the use of the new apparatus and method of the present invention. This new apparatus differs structurally from the Kopec apparatus and has a different mode of operation and gives new results. This new method substantially excludes air from the interior of the blank from before the point of welding to a point which is well beyond the point of welding and at which the weld metal is below a scaling temperature. This method assures the formation of welds which have substantially no inner flash or scale or highly oxidized metal.

In the drawings accompanying and forming a part of this specification,

Figure 1 is a fragmentary, longitudinal, sectional view thru a tube in an atomic hydrogen welding machine constructed in accordance with this invention and operating according to the present method, certain parts being shown in elevation;

Figure 2 is a longitudinal, horizontal, sectional view of the mandrel of Fig. 1, certain parts being broken away;

Figure 3 is an elevational view of the trailing end of the mandrel of Fig. 2; and Figure 4 is a cross-sectional view taken on line 4—4 of Fig. 2.

In Fig. 1 welding head 1 of an atomic hydrogen welding machine is shown, other parts of such machine not being illustrated. The tubing blank 2 is propelled from right to left as indicated by the arrow and its longitudinal seam edges are spaced a short distance apart until they reach the point of welding which is indicated at 3 just beneath the head 1. The mandrel which is designated as an entirety by numeral 4 is fixed in the position shown within the traveling blank 2.

As is better illustrated in Figs. 2, 3 and 4, the mandrel 4 comprises a cylinder 5, a rod 6 connected thereto and extending beyond the trailing end thereof, and a gas pressure regulator 7 attached to the trailing end of the rod 6.

The cylinder 5 is hollow, has an open trailing end 8 and an open leading end in which a plug 9 is positioned. This plug is connected to a tube 10 thru which hydrogen gas under pressure may be delivered into the interior of cylinder 5. The cylinder 5 is slightly smaller in diameter than the blank 2 and is provided with rings 11 and 12 near its leading and trailing ends, respectively, which have circumferentially bearing contact on the inner surface of the blank 2 and serve to prevent the flow of air in the tube past cylinder 5. Adjacent its leading end, and following ring 11, cylinder 5 has a plurality of axially spaced rows of small circumferentially arranged holes 13 which extend thru the wall of the cylinder and open into the bottoms of grooves 14. Between the trailing ring 12 and grooves 14 a plurality of small, longitudinally spaced and aligned holes 15 extend thru the wall of cylinder 5. These holes 15 are preferably aligned with the gap between the longitudinal edges of the blank 2, when the mandrel and tube are in assembled position as is shown in Fig. 1.

The rod 6 is attached to a cross bar 20 which is secured to the inner surfaces of cylinder 5, as by weld metal 21. This rod 6 is disposed substantially on the axis of cylinder 5 and extends to beyond the welding point 3 where, preferably, it is connected, as by coupling 22, to rod 23 which may be several feet in length. Within cylinder 5 and near its trailing end gas flow directing means is disposed. This means comprises parallel horizontal walls 25 disposed on opposite sides of rod 6 and parallel vertical walls 26 also disposed on opposite sides of rod 6.

The gas pressure regulator 7 is attached to the trailing end of rod 6 when it is of the desired length, or to the trailing end of extension rod 23. This pressure regulator, as shown, comprises an axially short tube 30 which is slightly less in diameter than the diameter of the welded blank 2 and which has a ring 31 to engage circumferentially with the inner surface of the blank and prevent ingress of air therepast into the tube. A perforated, preferably conical, wall 32 surrounds rod 23 and is connected to the leading end of tube 30. A cover 33 is hinged, as at 34, to the trailing end of tube 30 and is pressed into closed position by a light pressure spring 35.

The operation of the apparatus assembled and shown as described above is as follows: Hydrogen under pressure is delivered thru pipe 10 into cylinder 5 and substantially fills the blank 2 between the leading ring 11 on cylinder 5 and the ring 31 on tube 30. When this condition exists the welding head 1 is energized in the usual manner and endwise movement of blank 2 begins. The hydrogen liberated in cylinder 5 flows thru holes 13 and 15 and tends to surround cylinder 5, some of this gas escaping thru the open seam cleft above holes 15. In this manner the flow of air thru the blank past cylinder 5 is prevented and the flow of air into the blank thru the seam cleft is more or less completely prevented. The gas which flows lengthwise in cylinder 5 is directed along lines substantially parallel to the cylinder axis by the walls 25 and 26 so that hydrogen flowing from the trailing end 8 of cylinder 5 exhibits little or no tendency to swirl in the blank. Some of this hydrogen will tend to flow out of the tube thru the seam cleft just in advance to the point of welding 3. When the hydrogen pressure in the blank between cylinder 5 and pressure regulator 7 exceeds an amount sufficient to overcome the spring pressure exerted on cover 33, this cover will swing on its support and permit hydrogen to flow thru the perforated wall 32 and escape into the tube beyond the regulator.

From the foregoing description it will be understood that by means of the above described apparatus I am able to maintain a quantity of hydrogen gas a little above atmospheric pressure in the blank from a point some distance in advance of the point of welding to a point so far beyond the point of welding that the weld metal will have cooled down to below its scaling temperature before reaching that point; and that substantially all air may be excluded from the interior of the blank between those two points.

The apparatus of the present invention have given good results in commercial operation. The weld metal does not project inwardly beyond the inner surface of the blank to a measurable extent and for all practical purposes there is no inside flash metal. Moreover, the inner surface of the weld metal is free from scale and is not materially oxidized.

Obviously the above described preferred form of apparatus may be changed or modified in many respects, and other non-oxidizing gases may be used, all without departing from the spirit of the present invention or changing the above described method of operation. Other gases, such as helium, nitrogen, neon, argon, krypton and xenon may replace hydrogen in the present process for they will prevent oxidation of the highly heated metal and will blanket that metal and thereby exclude air therefrom and prevent oxidation thereof. Also, the relative movement between the tube blank on the one hand and the mandrel and welding head on the other hand may be accomplished by holding the tube blank in fixed position and moving the head and mandrel; or the mandrel may be substantially as long as a tube blank with cylinder 5 near one end and regulator 7 near the other end of the blank and the blank and mandrel may be moved while the head is fixed or fixed while the head is moved. Also, the electrical heating means shown may be replaced by other well known heating means including gas heaters. Other variations in structure and operation will be obvious to those skilled in the art.

Having thus described my invention so that others skilled in the art may be able to understand and practice the same, I state that what I desire to secure by Letters Patent is defined in what is claimed.

What is claimed is:

1. In apparatus including means for causing relative movement of a tubing blank having opposed longitudinal seam edges to be welded together, means for pressing said edges together with welding pressure at a predetermined welding point, and a welding head to heat said welding edges to welding temperature adjacent to said welding point, the combination of a mandrel in the blank, said mandrel comprising a hollow cylinder open at its trailing end and having substantially gas sealing contact with the inner surface of the blank and disposed in advance of the point of welding, a gas pressure regulator having substantially gas sealing contact with the inner surface of the blank beyond the point of welding, means connecting said cylinder and said pressure regulator, means for delivering non-oxidizing gas under pressure into the interior of said cylinder at its leading end, and means in said cylinder for directing the flow of such gas lengthwise of the blank along lines generally parallel to the axis thereof.

2. In apparatus including means for causing relative movement of a tubing blank having opposed longitudinal seam edges to be welded together, means for pressing said edges together with welding pressure at a predetermined welding point, and a welding head to heat said welding edges to welding temperature adjacent to said welding point, the combination of a mandrel in the blank, said mandrel comprising a cylinder having substantially gas sealing contact with the inner surface of the blank and disposed in advance of the point of welding, a gas pressure regulator in the blank beyond the point of welding, means connecting said cylinder and said pressure regulator, means for delivering non-oxidizing gas under pressure into the interior of said cylinder, and means in said cylinder for directing the flow of such gas lengthwise of the blank along lines generally parallel to the axis thereof.

3. In apparatus including means for causing relative movement of a tubing blank having opposed longitudinal seam edges to be welded together, means for pressing said edges together with welding pressure at a predetermined welding point, and a welding head to heat said welding edges to welding temperature adjacent to said welding point, the combination of a mandrel in the blank, said mandrel comprising a cylinder open at its trailing end and having gas sealing contact with the blank in advance of said welding point and a gas pressure regulator spaced beyond the trailing end of said cylinder and having gas sealing contact with said blanks, means for delivering non-oxidizing gas under pressure into the leading end of said cylinder, means in said cylinder for directing the flow of such gas lengthwise of the blank along lines generally parallel to the axis thereof, and closure means in said regulator actuated to open position when the pressure of gas in the blank exceeds a predetermined amount.

4. The apparatus including means for moving endwise a tubing blank having opposed longitudinal seam edges to be welded together, means for pressing said edges together with welding pressure at a predetermined welding point, and a welding head to heat said welding edges to welding temperature adjacent to said welding point, the combination of a mandrel in fixed position in the blank, said mandrel comprising a leading cylinder disposed a short distance in advance of the point of welding and a gas pressure regulator disposed a longer distance beyond the point of welding, said cylinder and regulator closely engaging the inner circumference of the blank, means for delivering non-oxidizing gas under pressure into the interior of said cylinder, and means in said cylinder for directing the flow of such gas lengthwise of the blank along lines generally parallel to the axis thereof.

5. A mandrel, for use in the welding of the longitudinal seam edges of a tubing blank, comprising a hollow cylinder open at its trailing end, a rod extending from said cylinder to beyond its trailing end and a gas pressure regulator at the trailing end of said rod, said regulator comprising a tube having a spring pressed closure at its trailing end, and means for delivering non-oxidizing gas under pressure into the interior of said cylinder.

6. A mandrel, for use in the welding of the longitudinal seam edges of a tubing blank, comprising a hollow cylinder open at its trailing end and slightly less in outside diameter than the inside diameter of the blank to be welded, a rod attached to said cylinder and extending beyond the trailing end of said cylinder, a gas pressure regulator connected to the trailing end of said rod, and means for delivering non-oxidizing gas under pressure into said cylinder.

7. A mandrel, for use in the welding of the longitudinal seam edges of a tubing blank, comprising a hollow cylinder open at its trailing end and slightly less in outside diameter than the inside diameter of the blank to be welded, means for delivering hydrogen gas into the leading end of said cylinder, a rod within and connected to the cylinder and extending beyond its trailing end, and a gas pressure regulator attached to the trailing end of said rod, said regulator comprising a tube slightly less in outside diameter than the inside diameter of the welded blank, a perforated wall at the leading end of said tube, and a spring pressed closure at the trailing end of said tube.

8. A mandrel, for use in the welding of the longitudinal seam edges of a tubing blank, comprising a hollow cylinder open at its trailing end and slightly less in outside diameter than the inside diameter of the blank to be welded, longitudinally spaced and aligned holes thru the cylinder wall between its ends, means for delivering a non-oxidizing gas into the leading end of said cylinder, means in the trailing end of the cylinder for directing the flow of gas therefrom along lines generally parallel to its axis, and a gas pressure controlling baffle connected to but spaced beyond the trailing end of said cylinder, said baffle comprising a tube slightly less in outside diameter than the inside diameter of the welded blank, a ring on said tube to engage the inner surface of the welded blank, a conical perforated wall at the leading end of said tube, and a spring-pressed closure at the trailing end of said tube.

9. A mandrel, for use in the welding of the longitudinal seam edges of a tubing blank, comprising a hollow cylinder open at its trailing end and slightly less in outside diameter than the inside diameter of the blank to be welded, longitudinally spaced and aligned holes through the cylinder wall between its ends, means for delivering non-oxidizing gas into the leading end of said cylinder, gas flow directing means in the trailing end of the cylinder comprising parallel, spaced, vertically and horizontally arranged walls extending longitudinally of the cylinder, and a gas pressure controlling baffle connected to said cylinder and spaced beyond its trailing end.

10. A mandrel, for use in the welding of the longitudinal seam edges of a tubing blank, comprising a hollow cylinder open at each end and slightly less in outside diameter than inside diameter of the blank to be welded, rings on the cylinder near its leading and trailing ends to engage the inner surface of the blank, circumferentially spaced holes thru the cylinder wall closely following the ring on the leading end of the cylinder, longitudinally spaced and aligned holes thru the cylinder wall between the circumferentially spaced holes and the ring near the trailing end of the cylinder, a plug in the leading end of the cylinder, a gas tube attached to an opening leading thru said plug into the cylinder, a rod within and connected to the cylinder and extending beyond its trailing end, gas flow directing means in the trailing end of the cylinder comprising parallel, spaced, vertically and horizontally arranged walls extending longitudinally of the cylinder, a pressure controlling baffle comprising a tube slightly less in outside diameter than the inside diameter of the welded blank, a ring on said tube to engage the inner surface of the welded blank, a conical perforated wall at the leading end of said tube, and a spring-pressed closure at the trailing end of said tube, and means connecting the said tube to said rod.

WALTER S. SCHAEFER.

REFERENCES CITED

The following references are of record in the file of this patent:

UNITED STATES PATENTS

| Number | Name | Date |
| --- | --- | --- |
| 1,810,112 | Riemenschneider | June 16, 1931 |
| 1,944,094 | Mayweg | Jan. 16, 1934 |
| 1,944,096 | Mayweg | Jan. 16, 1934 |
| 2,092,003 | Mitchell | Sept. 7, 1937 |
| 2,179,176 | Dunn | Nov. 7, 1939 |